Jan. 30, 1968  J. GOLDSCHEIN  3,366,288
DISPENSER HAVING A MOTOR OPERATED VALVE ASSEMBLY
Filed Oct. 11, 1965  2 Sheets-Sheet 1
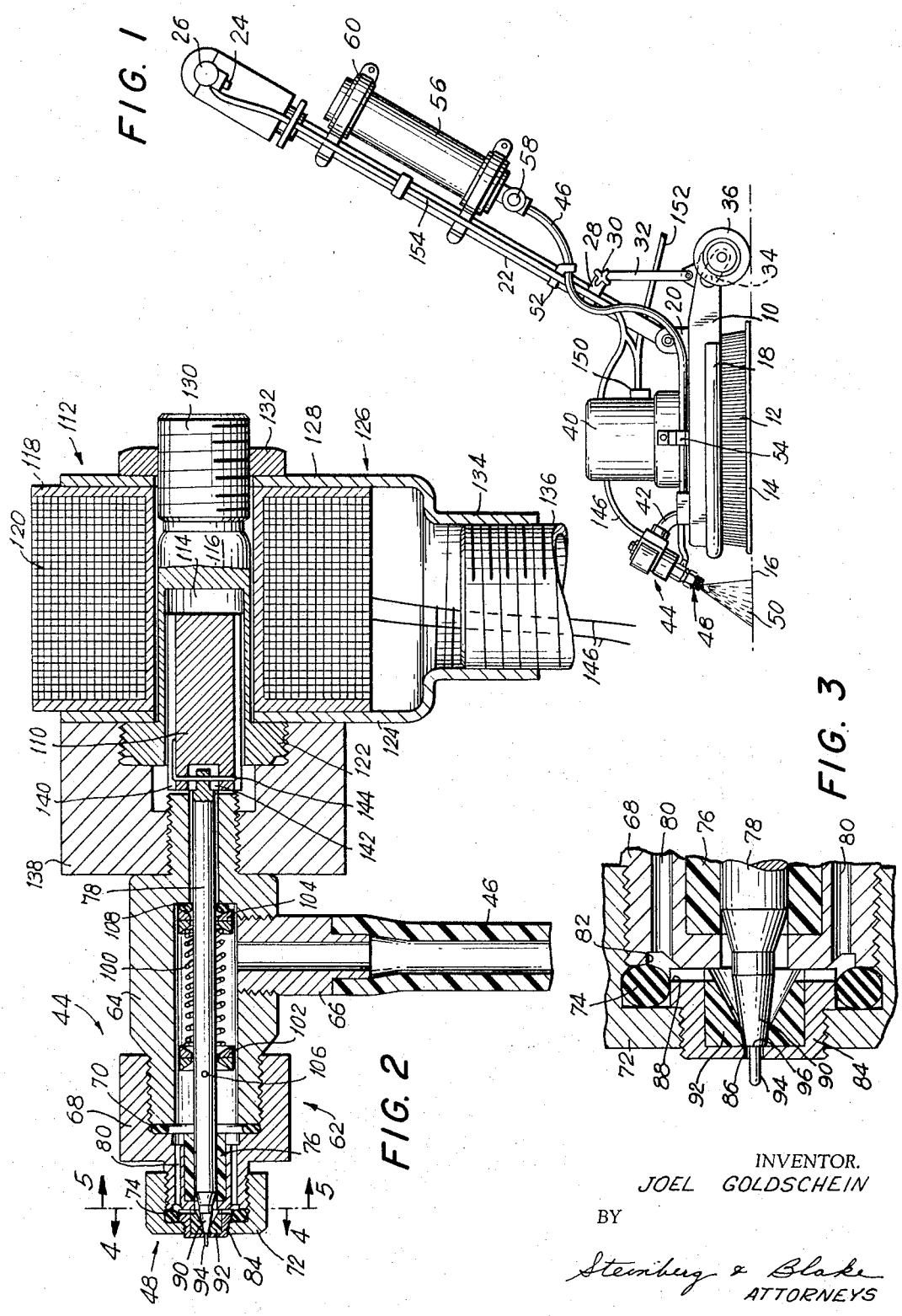
INVENTOR.
JOEL GOLDSCHEIN
BY
Steinberg & Blake
ATTORNEYS Jan. 30, 1968   J. GOLDSCHEIN   3,366,288
DISPENSER HAVING A MOTOR OPERATED VALVE ASSEMBLY
Filed Oct. 11, 1965   2 Sheets-Sheet 2

INVENTOR.
JOEL GOLDSCHEIN
BY
Steinberg & Blake
ATTORNEYS

United States Patent Office 3,366,288
Patented Jan. 30, 1968

3,366,288
DISPENSER HAVING A MOTOR OPERATED
VALVE ASSEMBLY
Joel Goldschein, East Northport, N.Y., assignor to
Ponsell Floor Machine Co., Inc., Huntington, N.Y.
Filed Oct. 11, 1965, Ser. No. 494,328
3 Claims. (Cl. 222—504)

ABSTRACT OF THE DISCLOSURE

A fluid dispenser for a machine such as a floor polisher. A supply conduit is provided for supplying the fluid which is to be dispensed, and a nozzle communicates with the supply conduit to receive the fluid therefrom so as to discharge the fluid. A valve assembly is situated in the path of fluid flow from the supply conduit to the nozzle and has closed and open positions respectively preventing and permitting fluid to flow from the supply conduit to the nozzle. A solenoid is provided with an armature which is shiftable between an advanced position and a retracted position, and this armature is operatively connected to the valve assembly to place the latter in its closed position when the armature is in its advanced position and to place the valve assembly in its open position when the armature is in its retracted position, so that energizing and de-energizing of the solenoid will control movement of the valve assembly between its open and closed positions, thus controlling the dispensing of the fluid. A stem is connected to the valve assembly for movement therewith and has a position extending through the nozzle when the valve assembly is in its closed position and retracted out of the nozzle when the valve assembly is in its open position, so that clogging of the nozzle by the fluid, which might otherwise dry therein during non-use of the machine, is avoided. The valve assembly has a stationary valve seat and a movable valve member engaging this seat when the valve assembly is in its closed position and displaced from the latter seat when the valve assembly is in its open position, and the stem is fixed to and extends from the valve member for movement therewith. An elongated rod is connected to the armature of the solenoid for movement with the armature, and this rod carries the valve member. The valve member tapers from a relatively large end to a relatively small end, and the stem is fixed to and projects from the small end of the valve member, this stem being of a smaller diameter than and forming a shoulder with the small end of the valve member.

The nozzle has a discharge aperture of a predetermined diameter which is smaller than the diameter of the small end of the valve member but larger than the diameter of the stem, so that the latter will have a slight clearance in the discharge aperture of the nozzle while the shoulder can engage an inner surface of the nozzle when the valve is closed with the stem extending through the discharge aperture of the nozzle.

The present invention relates to fluid dispensers.

More particularly, the present invention relates to fluid dispensers which are adapted to dispense rather viscous liquids such as floor polishing mediums.

One of the primary drawbacks of structures of the above type is that the discharge aperture of a nozzle thereof easily becomes clogged with the polishing medium which dries in the nozzle aperture during non-use of the fluid dispenser. At the present time, for example, it is not uncommon to find floor-polishing machines accompanied by instructions to the operator to initially unclog the discharge nozzle before using the machine. Although such instructions are given, they are seldom followed, with the result that improper dispensing of the polishing medium is encountered and the quality of the polishing operations are greatly impaired.

It is primarily because of the above factors that efforts have been made to provide structures which will operate automatically to prevent clogging of the discharge nozzles. While it is possible to provide such structures, and in fact several different types are known, all of the attempts made to solve this problem up to the present time have involved extremely complex structures which are expensive and which easily give rise to faulty operation because of the complexity of the components thereof as well as the large number of components which must operate to produce the desired results.

It is, therefore, a primary object of the present invention to provide a fluid dispenser of the type which is adapted for use with a polishing machine with a construction which while being extremely simple nevertheless will reliably prevent in a fully automatic manner clogging of the discharge nozzle.

In particular, it is an object of the invention to provide the automatic non-clogging of the invention with an electrically operated discharge nozzle so that all that the operator need do is close and open one or more switches in order to bring about the required operations.

Furthermore, it is an object of the invention to provide a structure of the above type which not only will automatically prevent clogging of the discharge nozzle but which will also function to provide an extremely favorable type of spray of the medium from the nozzle.

Furthermore, it is an object of the invention to provide not only an exceedingly simple and inexpensive structure which is very reliable in operation, but in addition a structure which is exceedingly compact so that there is absolutely no difficulty involved in accommodating the structure on a relatively small part of a floor polishing machine, for example, with the nozzle directed at the best possible angle for depositing the polishing medium precisely where desired with respect to the floor polishing components.

The structure of the invention will in general include a supply conduit means through which the fluid which is to be dispensed is supplied, and a nozzle means communicates with the supply conduit means to receive the fluid therefrom and to discharge the fluid. In the path of flow of the fluid from the supply conduit means to the nozzle means is situated a valve means which can be closed and opened for respectively preventing and permitting the flow of fluid from the supply conduit means to the nozzle means. In accordance with one of the features of the invention this valve means is operatively connected with the armature of a solenoid, and the solenoid armature is shiftable between advanced and retracted positions where the valve means is respectively closed and opened, so that by energizing and de-energizing the solenoid it is possible to control the valve means and thus control the flow of fluid from the dispenser. In accordance with a further feature of the invention, the valve means directly carries a stem which is situated in and extends through the discharge aperture of the nozzle means when the valve means is closed and which is retracted out of this discharge aperture when the valve means is open, so that this movement of the stem out of the discharge aperture upon opening of the valve means will guarantee that the fluid can flow freely through the discharge aperture of the nozzle means, and thus clogging thereof is reliably avoided.

The invention is illustrated by way of example in the accompanying drawings which form part of the application and in which:

FIG. 1 is a somewhat schematic side elevation of a floor polishing machine which includes the structure of the present invention;

FIG. 2 is a longitudinal sectional elevation showing the details of one possible embodiment of a dispenser structure according to the invention;

FIG. 3 shows the structure at the left end of FIG. 2 at an enlarged scale, as compared to FIG. 2, so as to more clearly illustrate certain details of the structure of the invention;

Figure 4:
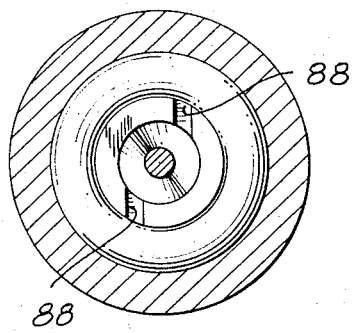
FIG. 4 is a transverse section of the structure of FIG. 2 taken along line 4—4 of FIG. 2 in the direction of the arrows.

Referring now to the drawings and to FIG. 1 in particular, there is shown therein a mounting plate 10 which supports a brush assembly 12 for rotary movement, and a suitable circular pad 14 may be situated beneath the bristles of the brush 12 to rotate with the latter and polish a floor 16 in a well known manner.

The mounting plate 10 is provided with a rubber bumper 18. In addition it has a pair of upstanding lugs 20 which support between themselves a pivot pin to which the bottom end of the handle rod 22 is pivoted. This handle rod 22 may be in the form of a suitable rigid pipe, for example, and at its top end it carries a fitting 24 by means of which a pair of manually-engageable handle members 26 are fixed to the top end of the turnable handle 22. This structure at the top end of the handle rod 22 is indicated fragmentarily in FIG. 6.

As is indicated at the lower portion of the rod 22 in FIG. 1, a clamp 28 is slidable along the rod 22 and can be clamped at any selected elevation therealong by means of a rotary wing nut 30. The clamp 28 is pivotally connected with a link 32 which is in turn linked to the mounting plate 10, so that when the wing nut 30 is loosened the operator can slide the clamp 28 along the rod 22 while setting the latter at an inclination which is comfortable for the operator, after which the nut 30 can be tightened so as to maintain the handle 22 at an inclination which is most suitable for the particular operator.

At its rear end the mounting plate 10 pivotally carries a pair of interconnected links 34 which can swing as a unit with respect to the plate 10 and which serve to support for rotary movement a pair of wheels 36. With this arrangement the structure can be positioned as shown in FIG. 1 where the weight of the entire machine is carried by the brush 12, or the operator can tilt the brush 12 upwardly at its rear end so that the entire assembly of FIG. 1 is turned in a counterclockwise direction about its lower front end, thus enabling the wheels 36 to swing inwardly under the plate 10, after which the operator can simply tilt the entire machine back so that it will rest on the wheels 36 for the purpose of being transported to a desired location with the brush 12 raised away from the floor. This latter structure is well known and forms no part of the invention.

The floor polishing structure 12 is motor-driven, and for this purpose the mounting plate 10 carries an electric motor 40 which is supplied with current in a manner described below for the purpose of driving the brush 12 and the pad 14.

At its front upper surface portion, the mounting plate 10 fixedly carries a bracket 42, and this bracket 42 carries the fluid-dispenser 44 of the present invention. This dispenser 44 receives the fluid which is to be dispensed, a liquid floor polish in the above example, from a supply conduit means 46 which supplies the fluid directly to the dispenser 44, and this dispenser 44 has a nozzle means 48 through which the fluid is discharged in the form of a conical spray 50 onto the floor 16, as indicated in FIG. 1. Of course, the fluid is sprayed onto the floor directly in front of the pad 14 so that the operator can immediately polish the floor with the fluid which has been dispensed onto the latter. The supply conduit means 46 may take the form of any suitable flexible hose which can be connected in any way, as by one or more clamps 52, to the rod 22 from which the conduit 46 is guided along the top of the plate 10, also by means of suitable guide clamps 54, to the dispenser 44. The supply conduit 46 receives the fluid from a suitable container 56 which may have a pressurized propellant gas which serves to discharge the fluid from the container 56 into the conduit 46 and along the latter to the dispenser 44. A valve 58 may be provided to close and open the inlet end of the conduit 46 where it communicates with the container 56 for the pressurized fluid. Suitable clamping brackets 60 are carried by and extend from the rod 22 and serve to support the container 56 in the manner shown diagrammatically in FIG. 1.

Referring now to FIG. 2 in which the details of one possible embodiment of a dispenser 44 according to the invention are illustrated, it will be seen that a sleeve assembly 62 defines a flow path for the fluid from the supply conduit means 46 to the discharge nozzle means 48. This sleeve assembly 62 includes an elongated tubular sleeve 64 made of any suitable metal, for example, and formed with a tapped bore which receives a threaded fitting 66 which communicates fluid tightly on the one hand with the conduit 46 and on the other hand with the sleeve 64 so that the fluid flows from the conduit 46 into the interior of the sleeve. This sleeve 64 in turn is threaded into a second sleeve 68 of the assembly 62, and a suitable sealing member such as the resilient elastic O-ring 70 is clamped between an end of the sleeve 64 and an interior shoulder of the sleeve 68 to guarantee fluid-tightness at the connection between the sleeves 64 and 68. The nozzle means 48 includes a cap-nut member 72 which is threaded onto the sleeve member 68, and in this case also a suitable elastic O-ring 74 is clamped between the free end of the sleeve 68 and an inner end surface of the cap nut 72 to assure fluid-tightness in the assembly of the nozzle 48 with the sleeve 68.

Figure 5:
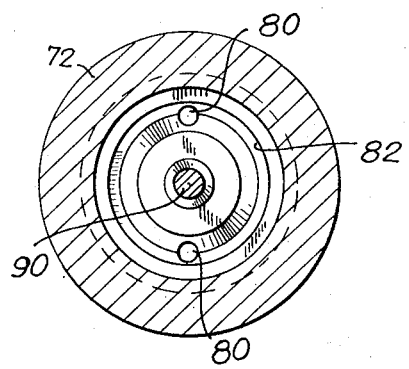
FIG. 5 is a transverse section of the structure of FIG. 2 taken along line 5—5 of FIG. 2 in the direction of the arrows.

The sleeve 68 fixedly carries at its interior bore portion a guide member 76 in the form of a tube of Teflon, for example, and an elongated rod 78 is guided for movement through and slidably engages the guiding tube 76. The inner wall portion of the sleeve 68 which carries the guiding tube 76 is formed just beyond the tube 76 with a pair of diametrically opposed bores 80, shown also in FIG. 5, and because of the fluid-tight sliding fit of the rod 78 in the guide sleeve 76 it is possible for the fluid to reach the left end of the sleeve 68 only through the bores 80 thereof.

As is shown most clearly in FIG. 3, the bores 80 feed into an annular channel 82 formed in the left end face of the sleeve member 68, and this left end face of the sleeve member 68 engages at its inner portion which is surrounded by the channel 82 the right end face of the nozzle member 84 which is formed with the discharge aperture 86. This right end face of the nozzle 84 is in the form of a ring which not only presses against the left end face of the sleeve 68 but which also is formed with a pair of diametrically opposed notches 88 shown most clearly in FIG. 4. It is to be noted from FIG. 4 that these notches 88 do not extend radially with respect to the axis of the nozzle. Instead they are inclined to radii which extend from the axis of the nozzle. Therefore, with this construction when the fluid under pressure passes through the bores 80 into the annular channel 82, the fluid will flow around the channel 82 and through the notches 88 so as to reach the discharge aperture 86 with a whirling motion imparted to the fluid by the fluid-whirling means formed by the notches 88, and in this way the discharge of the fluid through the aperture 86 in the form of a fine spray of conical configuration, as indicated at 50 in FIG. 1, is assured.

In order to open and close the nozzle a valve means is provided in the path of flow of fluid from the conduit means 46 to the nozzle means 48, and this valve means is movable between closed and open positions for respectively preventing and permitting the flow of fluid from the supply conduit means 46 out through the nozzle means 48. This valve means includes a frustoconical valve member 90 which is fixedly directly to and is in fact integral with the rod 78. Within the hollow interior of the nozzle housing 84 is situated an elastic valve seat member 92 made, for example, of Teflon and having an inner frustoconical valve seat forming part of a cone whose apex angle is greater than the cone of which the frustoconical valve member 90 forms a part, so that in this way the valve member 90 and its valve seat 92 will cooperate in the manner indicated in FIGS. 2 and 3. The elastic material 92 is deflected by the valve member 90 when the latter is in its closed position, and upon retraction of the valve member 90 to the right, as viewed in FIGS. 2 and 3, for opening the valve the elastic valve seat member 92 can expand somewhat so as to provide a fluid-tight closure when it is again deformed by the valve member 90 during subsequent closing of the valve.

In accordance with a further feature of the invention, this tapered valve member 90 fixedly carries at its smaller end an elongated stem 94 which is integral with the valve member 90 and which defines a shoulder 96 therewith. The outer diameter of the shoulder 96 is somewhat greater than the diameter of the aperture 86 while the diameter of the stem 94 is somewhat less than the diameter of the aperture 86, so that while the stem 94 can pass with a very slight clearance through the aperture 86 the shoulder 96 will engage the inner surface of the nozzle housing 84 to limit the movement of the rod 78 to the left, as viewed in FIG. 2, and thus the stem 94 will have the degree to which it projects beyond the nozzle limited by engagement of the shoulder 96 with the inner surface of the nozzle housing 84.

With this construction when the valve member 90 is retracted to its open position the stem 94 will be retracted to the right, as viewed in FIGS. 2 and 3, out of the discharge aperture 86 of the nozzle, so that clogging of the latter is reliably avoided.

A spring means urges the valve 90, 92 into the closed position thereof, and this spring means includes a coil spring 100 coiled about the rod 78 within the sleeve 64 and abutting at one end against a ring assembly 102 and at its opposite end against a ring assembly 104. The rod 78 carries a cross pin 106 which limits the movement of the ring assembly 102 to the left along the rod 78, while the ring assembly 104 presses an O-ring 108 against an inner shoulder of the sleeve 64, so that with the shoulder 96 engaging the nozzle wall in the manner described above, the parts will assume the position indicated in FIG. 2 and of course in this position the spring 100 is still substantially compressed.

In accordance with a further feature of the invention the rod 78 is directly connected with the armature of a solenoid to be actuated by displacement of the armature between its advanced and retracted positions, and the armature 110 of the solenoid 112 is shown in FIG. 2 in its advanced position to which it is displaced by the force of the spring 100. The armature 110 is axially shiftable within a bore 114 of a core member 116 which extends through the casing 118 of the soleonoid coil 120, and at its left end the core member 116 has an outwardly directed threaded flange 122 pressing against a bracket wall 124 which is clamped between the casing 118 and the flange 122. The bracket 126 includes in addition to the wall 124 a second wall 128 through which a threaded portion 130 of the core 116 passes, and a nut 132 clamps the bracket wall 128 against the casing 118. This bracket 126 has an internally threaded tubular portion 134 which receives the threaded end of a tubular mounting member 136 carried by the mounting plate 10 and forming part of the supporting bracket 42 referred to above, so that in this way the entire dispenser assembly 44 of the invention can be mounted on the floor polishing machine.

The externally threaded right end portion of the sleeve 64 is of a reduced diameter and is threaded into a combined spacer and housing member 138 which is threaded onto the flange 122 in the manner shown most clearly in FIG. 2.

The armature 110 is slidable within the bore 114, as pointed out above, and is formed with a pair of diametrically opposed, parallel, axially extending, external grooves 140 through which air can freely pass from one to the other side of the armature during axial shifting thereof. At its left end the armature is formed with a recess 142 into which the right end of the rod 78 passes with clearance, and this right end of the rod 78 is formed with a transverse bore capable of being aligned with a pair of transverse bores which are coaxial with each other and which extend transversely through portions of the armature 110 which communicate with the grooves 140 thereof. An elongated connecting pin 144 of L-shaped configuration has one leg received in one of the grooves 140 with considerable clearance and has its other leg extending through the aligned bores of the armature 110 and the right end of the rod 78, as indicated in FIG. 2, so that in this way the rod 78 is pivotally connected with the armature 110 and is constrained to shift axially therewith.

The coil 120 receives its current through a pair of conductors 146. When the circuit through these conductors is completed, in a manner which is described in greater detail below, the energized solenoid will retract its armature 110 to the right, as viewed in FIG. 2, in opposition to the spring means 100, with the result that the valve member 90 will be retracted away from the valve seat 92 and the stem 94 will be retracted out of the discharge aperture 86 of the nozzle means 48, so that now the fluid under pressure in the supply conduit means 46 can continues to flow through the flow path defined by the sleeve assembly 62, through the bores 80, into the channel 82, around the latter to the notches 88 and then through the open valve and out through the discharge aperture 86. When the soleonide 112 is de-energized the spring 100 will return the parts to the position shown in FIG. 2.

Figure 6:
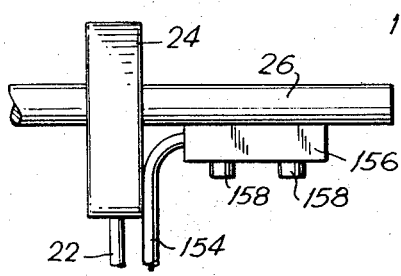
FIG. 6 shows in a fragmentary elevation the handle structure of the polishing machine, and in particular the arrangement of manually operable switches at this handle structure.
Figure 7:
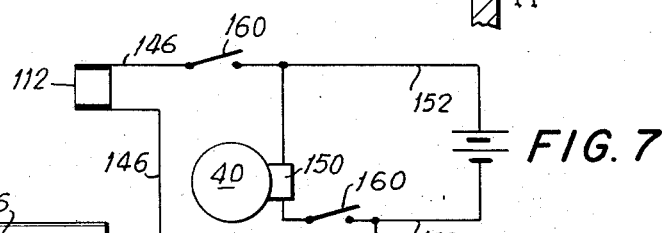
FIG. 7 is a wiring diagram of the electrical structure.

The driving motor 40 is electrically connected through a suitable receptacle 150 with conductors 152 which extend to a suitable wall outlet, for example. The solenoid conductors 146 are connected through these conductors 152 also with the wall outlet, and all of the conductors pass along a cable 154 upwardly along the handle rod 22, to which the cable 154 is fixed by any suitable clamps, for example, and this cable assembly 154 is connected to a switch assembly 156 fixedly carried by one of the handle bars 26, as shown in FIG. 6. This switch assembly 156 has a pair of push buttons 158 capable of being actuated by the fingers of one hand of the operator and resiliently urged to their outer positions where the switches actuated thereby are open. Upon pushing on one or both of the push buttons 158 the operator will close, at his option, the switches actuated thereby. The switches 160 which are actuated by the push buttons 158 are shown in the wiring diagram of FIG. 7 where the solenoid 112 and the motor 40 are also schematically illustrated together with the receptacle 150. FIG. 7 schematically illustrates how the conductors 152 are connected with a source of current which actually will be the alternating current available from the public utility. As is apparent from the wiring diagram of FIG. 7, the operator, by actuating the push buttons 158 of FIG. 6, can energize the motor 40 and the solenoid 112 either separately or simultaneously, and through this simple manipulation it is possible to control the operation of the floor polishing machine of the invention.

Figure 8:
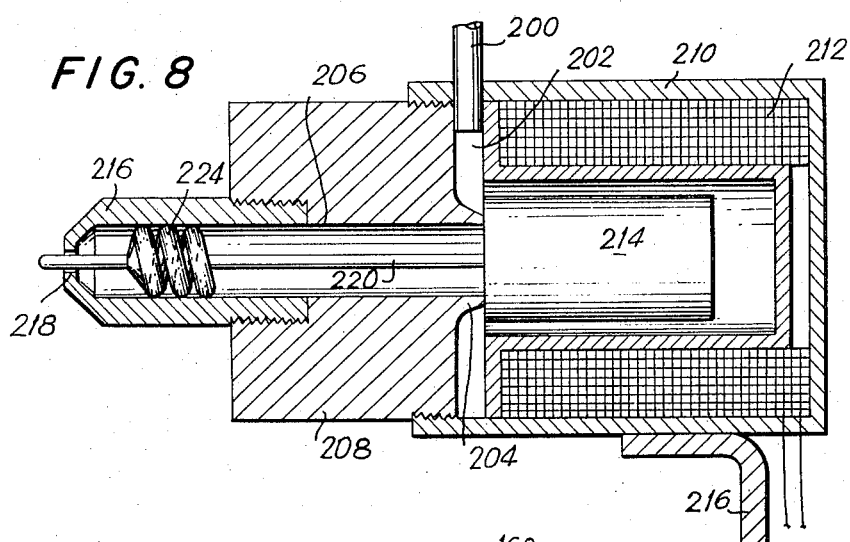
FIG. 8 is a longitudinal sectional elevation schematically illustrating another embodiment of a dispenser according to the invention.

Although the dispenser structure shown in FIG. 2 and described above is preferred because of its reliability in operation and simplicity of structure, it is also possible to use in accordance with the invention a structure as shown diagrammatically in FIG. 8. As may be seen from FIG. 8, the supply conduit means 200 which corresponds to the supply conduit means 46 supplies the fluid under pressure into an annular space 202 which surrounds a valve seat 204. This valve seat is formed at one end of a conduit means 206 which is formed by a bore in the interior of the member 208 which has a threaded exterior to which the solenoid-carrying casing 210 is threaded, and the discharge end of the conduit 200 passes through this casing 210 so as to communicate with the space 202 in the manner shown in FIG. 8. The solenoid casing serves to support the solenoid coil 212 which can be supplied with current in the same way as the coil 120 and which accommodates in its interior the armature 214. In this embodiment it is the left end of the armature 214 which forms the valve member cooperating with the valve seat 204 in order to open and close the valve for permitting and preventing flow of fluid out through the nozzle 216 which is in the form of an elongated tubular member threaded into the member 208 and having a discharge aperture 218. In this case an elongated stem 220 is fixed directly to the end of the armature which forms the valve member, and the left free end of the stem 220 extends with a slight clearance through the aperture 218 when the valve is closed so as to occupy the interior of the discharge aperture 218. When the solenoid is energized the armature 214 will be retracted to the right, as viewed in FIG. 8, thus displacing the left end of the stem 220 out of the aperture 218, so as to open this aperture and so as to guarantee that there will be no clogging thereof.

A helical fluid-guide member 224 is fixedly carried by the stem 220 in the interior cylindrical portion of the nozzle member 216 and has its exterior helical periphery slidably engaging the inner cylindrical surface of the nozzle member 216, so that the fluid is constrained to flow along a helical path before it can reach the discharge nozzle 218, and in this way the embodiment of FIG. 8 is provided with a fluid-whirling means for imparting to the fluid a whirling movement as it discharges through the aperture 218, so as to guarantee the formation of an efficient fluid-distributing cone similar to the spray cone 50 shown in FIG. 1.

With the embodiment of FIG. 8 it is the pressure of the fluid itself which urges the solenoid armature 214 to the left to the position where the left end of the armature acts as a valve member to engage the valve seat 204 and close the valve to prevent flow of fluid out of the nozzle. However, if desired a suitable spring may be provided for urging the armature 214 to the left to its valve-closing position indicated in FIG. 8. A suitable bracket assembly 216 is provided for mounting the dispenser structure of FIG. 8 on the mounting plate 10 of the machine.

What is claimed is:

1. In a fluid dispenser for a machine such as a floor polisher, supply conduit means for supplying the fluid which is to be dispensed, nozzle means communicating with said supply conduit means for receiving the fluid therefrom and for discharging the fluid, valve means situated in the path of fluid flow from said supply conduit means to said nozzle means and having closed and open positions respectively preventing and permitting fluid to flow from said supply conduit means to said nozzle means, solenoid means including an armature shiftable between an advanced position and a retracted position, said armature being operatively connected to said valve means for placing the latter in said closed position when said armature is in said advanced position thereof and for placing said valve means in said open position when said armature is in said retracted position thereof, so that energizing and de-energizing of said solenoid means will control movement of said valve means between said open and closed positions thereof, so as to control the dispensing of the fluid, and a stem connected to said valve means for movement therewith and having a position extending through said nozzle means when said valve means is in said closed position thereof and retracted out of said nozzle means when said valve means is in said open position thereof, so that clogging of said nozzle means by fluid which might otherwise dry therein during non-use of the machine is avoided, said valve means including a stationary valve seat and a movable valve member engaging said valve seat when said valve means is closed and displaced from said seat when said valve means is open, said stem being fixed to and extending from said valve member for movement therewith, an elongated rod connected to said armature for movement therewith and carrying said valve member, said valve member tapering from a relatively large end to a relatively small end and said stem being fixed to and projecting from said small end of said valve member, said stem being of a smaller diameter than and forming a shoulder with said small end of said valve member, and said nozzle having a discharge aperture of a predetermined diameter which is smaller than the diameter of said small end of said valve member but larger than the diameter of said stem so that the latter will have a slight clearance in said discharge aperture of said nozzle means while said shoulder can engage an inner surface of said nozzle means when said valve means is closed with said stem extending through said discharge aperture of said nozzle means.

2. In a dispenser as recited in claim 1, said valve seat being directly carried by said nozzle means and being made of a flexible resilient material capable of yielding when engaged by said valve member, said valve seat having a frustoconical configuration tapering in the same direction as said valve member but forming part of a cone whose apex angle is greater than that of said valve member.

3. In a fluid dispenser adapted to be used with a machine such as a floor polisher, a discharge nozzle, an elongated conduit communicating with said nozzle and having distant from said nozzle the configuration of a valve seat, an elongated stem extending substantially coaxially through said conduit and into said nozzle to prevent clogging thereof when the dispenser is not used, a solenoid armature carrying said stem and having an end engaging said valve seat in one position of said armature so that said end thereof forms a valve member cooperating with said valve seat for closing said conduit, and said stem extending through said nozzle when said armature engages said valve seat while being retracted out of said nozzle when said armature is displaced away from said valve seat, supply conduit means communicating with a space surrounding said valve seat to supply fluid to the interior of said conduit when said armature is retracted away from said valve seat, and a solenoid coil cooperating with said armature for retracting the latter away from said valve seat when said coil is energized.

References Cited

UNITED STATES PATENTS

| | | | |
|---|---|---|---|
| 1,679,159 | 7/1928 | French | 239—585 X |
| 2,267,272 | 12/1941 | Barraja-Frauen-Felder et al. | 239—585 X |
| 2,979,231 | 4/1961 | Witherspoon | 222—504 X |
| 3,058,136 | 10/1962 | Rachlin | 15—50 |
| 3,071,792 | 1/1963 | Rachlin | 15—50 |
| 3,094,152 | 6/1963 | Kenny et al. | 15—50 X |
| 3,241,768 | 3/1966 | Croft | 239—585 X |
| 3,257,078 | 6/1966 | Mekkes | 239—584 X |

FOREIGN PATENTS 625,529  11/1933  Germany.

WALTER SOBIN, *Primary Examiner.*